Patented July 2, 1935

2,007,092

UNITED STATES PATENT OFFICE 2,007,092

MANUFACTURE OF ANTIMONY COMPOUNDS

Walter Kussmaul, Basel, Switzerland, assignor to the firm Chemical Works Formerly Sandoz, Basel, Switzerland No Drawing. Application November 21, 1929, Serial No. 408,936. In Germany November 30, 1928

5 Claims. (Cl. 260—11)

It is known that the simple salts of antimony are hydrolized in water and do not yield clear solutions. It is further known that the salts of complex compounds of antimony are clearly soluble in water but often possess in aqueous solution an acid reaction; this is the case for instance of the very largely used tartar emetic. On addition of alkali with a view of neutralizing the acid reaction, the solutions become muddy and a precipitation of basic antimony compounds occurs.

In order to prepare clearly soluble derivatives of antimony with monocarboxylic acids from aldoses, it has been observed that antimony hydroxide precipitated from tartar emetic by means of mineral acids, easily dissolves in an aqueous solution of e. g. gluconic acid, yielding a clear solution. But the product isolated is no longer clearly soluble in water and is hydrolized like a simple antimony salt.

Only on addition of more gluconic acid or sodium hydroxide the solution becomes clear. The solution to which sodium hydroxide has been added contains, therefore, a gluconic acid compound of antimony and sodium and experiments carried out proved this assumption to be correct, as it was found that antimony hydroxide is indeed soluble in neutral aqueous solutions of sodium gluconate. This observation must be regarded as a really surprising one, because the most of the known salts of antimony with organic acids, e. g., tartar emetic, antimonyloxalic acid, etc., are derivatives of di- or polybasic acids and the general structural conception of these salts was considered to be such a one that the SbO-group is linked to one of the carboxylic group, whilst the remaining carboxylic group is capable of reacting with alkalis under formation of salts. Contrary to this in the present case the antimony compound is a derivative of a monocarboxylic acid.

The product prepared by dissolving antimony hydroxide in an aqueous sodium gluconate solution consists of sodium antimonylgluconate and contains on each molecule of sodium gluconate one atom of antimony, the last being probably linked in a complex manner. An aqueous solution of this new compound shows an acid reaction which can almost completely be neutralized with sodium hydroxide. Weak alkaline solutions of this salt remain clear at first, but become muddy after a long time at ordinary temperature and rapidly if the solution is heated.

As it has further been found, this precipitation may easily be avoided by an addition of alkali metal gluconate to those solutions.

For instance a solution containing 1 part of sodium antimonylgluconate and 1.5 parts of sodium gluconate can be neutralized or slightly alkalized without it becoming muddy. Even after long heating in a water bath the solution remains perfectly clear.

In order to prepare the new, clearly soluble and stable antimony derivatives, the freshly prepared antimony oxyhydrate is treated with aqueous solutions of salts of such monocarboxylic acids which are obtained for instance by oxidizing aldoses as described for instance in the U. S. Patent Specification No. 1,648,368, e. g. gluconic acid, galactonic acid, lactobionic acid etc.

The same antimony compounds may also be prepared by dissolving antimony hydroxide in aqueous solutions containing an excess of the carboxylic acid and neutralizing thereafter with alkali.

The new antimony compounds may be advantageously employed for pharmaceutical and other chemical purposes.

The following examples illustrate the invention:

Example 1

To a solution of 10 grammes of sodium gluconate in 20 parts of warm water, freshly precipitated and still wet antimony trihydroxide is added until the solution remains milky. The solution thus obtained is filtered and after cooling down treated with 200 parts of alcohol. A thick plastic mass is obtained which after a certain time becomes hard and can easily be ground, washed with alcohol and dried.

The new product thus obtained is a white non-hygroscopic powder, easily soluble in water with a slight acid reaction, insoluble in most of the usual organic solvents. Its aqueous solutions become muddy on addition of mineral acids, the precipitate being redissolved on further addition of large quantities of such acids. On addition of alkali to its aqueous solutions, they remain first clear and become muddy only after a long heating.

Example 2

3 parts of sodium antimonylgluconate and 4,5 parts of sodium gluconate are dissolved in 15 parts of hot water and treated with 2-n sodium hydroxide solution until the acid reaction has disappeared. The solution thus obtained may easily be diluted or heated in a water bath without any precipitation occurring.

What I claim is:

1. Antimony compounds formed by reacting antimony hydroxide in aqueous solutions of alkali metal salts of mono-carboxylic acids of the kind formed by oxidizing an aldose, said compounds constituting in dry state white, non-hygroscopic powders, soluble in water and insoluble in most of the usual organic solvents.

2. Antimony compounds formed by reacting antimony hydroxide in aqueous solutions of sodium salts of mono-carboxylic acids of the kind formed by oxidizing an aldose, said compounds constituting in dry state white, non-hygroscopic powders, soluble in water and insoluble in most of the usual organic solvents.

3. Sodiumantimonylgluconate, which constitutes in dry state a white, non-hygroscopic powder, soluble in water with a slight acid reaction, insoluble in most of the usual organic solvents, soluble in aqueous alkali metal gluconate yielding a stable solution.

4. A process for the manufacture of stable aqueous solutions of sodium antimonylgluconate, characterized in adding to aqueous solutions of sodium antimonylgluconate an alkali metal gluconate.

5. Stable aqueous solutions of sodium antimonylgluconate containing as stabilizing agent sodium gluconate.

WALTER KUSSMAUL.